(12) United States Patent
Reasoner

(10) Patent No.: US 8,566,850 B1
(45) Date of Patent: Oct. 22, 2013

(54) MULTIMEDIA DRIVE

(75) Inventor: Kelly J. Reasoner, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/444,480

(22) Filed: Apr. 11, 2012

(51) Int. Cl.
*G11B 17/03* (2006.01)

(52) U.S. Cl.
USPC .............................................. 720/616

(58) Field of Classification Search
USPC ......... 720/616, 622, 643, 619, 651, 603, 645, 720/627, 646, 601, 606, 608, 623, 621; 369/30.9
See application file for complete search history.

(56) References Cited

U.S. PATENT DOCUMENTS

| | | | | |
|---|---|---|---|---|
| 6,473,260 B1* | 10/2002 | Seo et al. | ....................... | 720/616 |
| 6,504,808 B2* | 1/2003 | Wada et al. | .................... | 720/616 |
| 6,954,937 B2* | 10/2005 | Kim et al. | ...................... | 720/616 |
| 6,973,660 B2* | 12/2005 | Obata | ........................... | 720/616 |
| 6,993,777 B2* | 1/2006 | Kabasawa | ...................... | 720/626 |
| 7,061,767 B2* | 6/2006 | Schmidtke et al. | ............ | 361/724 |
| 7,113,465 B2* | 9/2006 | Lee | ............................... | 369/53.2 |
| 2003/0048732 A1* | 3/2003 | Inata et al. | .................... | 369/77.2 |
| 2004/0181388 A1* | 9/2004 | Yip et al. | ........................ | 703/25 |
| 2005/0076349 A1* | 4/2005 | Santo et al. | .................... | 720/616 |
| 2006/0218434 A1 | 9/2006 | Solhjell | | |
| 2011/0022792 A1 | 1/2011 | Kay | | |

* cited by examiner

*Primary Examiner* — Allen T Cao

(57) ABSTRACT

A multimedia drive receives different types of media in a single drive. The multimedia drive includes a drive to receive a media cartridge, such as a tape media cartridge or a non-tape media cartridge. The multimedia drive includes a tape media interface to connect to a tape cartridge, and includes a non-tape media interface to connect to a non-tape media cartridge.

15 Claims, 5 Drawing Sheets

MULTIMEDIA DRIVE

BACKGROUND

Conventional data storage systems often backup data in case of data loss. Many backup systems use tape drives to backup data on magnetic tape. Tape is a low cost medium for storing data but when compared to other storage mediums, such as hard drives, data access can be slow. Accordingly, many storage systems utilize multiple types of drives using different storage mediums, such as hard drives, tape drives, etc., which increases costs and requires more space to accommodate the drives.

BRIEF DESCRIPTION OF DRAWINGS

The embodiments are described in detail in the following description with reference to the following examples disclosed in the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

A multimedia drive is operable to receive different types of storage mediums in a single drive. Different cartridges housing different types of mediums may be inserted into the drive. For example, a tape cartridge with a tape medium may be received by the drive. The tape medium is a magnetic tape that can store data. Data may be read from or written to magnetic tape in a tape cartridge. Other types of cartridges using different storage mediums may also be received by the media drive. A cartridge is a housing for the data storage medium in the cartridge. A cartridge with a storage medium is referred to as a media cartridge. Examples of different types of media cartridges, other than a tape cartridge, include a solid state cartridge using a solid state medium to store data and a hard disk cartridge housing a hard disk to store data. Other types of storage mediums may be used in a media cartridge as well. In one example, the media cartridges have dimensions that conform to standard dimensions of a conventional tape cartridge. Also, the multimedia drive may have dimensions that conform to standard dimensions of a conventional tape drive. Therefore, the multimedia drive and the media cartridges may be stored in racks or bays designed for conventional storage devices.

The multimedia drive can receive different types of media cartridges so multiple different drives do not need to be purchased and installed to accommodate different types of storage mediums. Furthermore, different types of media cartridges may be used in the multimedia drive to accommodate different storage needs of a user. For example, a solid state cartridge may be used in the multimedia drive if fast data access is needed, but a lower cost tape cartridge may be used for backups. Thus, the versatility of the multimedia drive can be used to accommodate varying data access requirements of the user in a single drive.

Multimedia drives may be used in an automated storage system. Data may be stored on media cartridges in the storage system. The media cartridges may be stored in one or more libraries having a plurality of storage cells. A storage cell may include storage equipment to house the media cartridges. A storage cell may include modular shelves or other types of storage equipment. The libraries may be modular (e.g., configured to be stacked one on top of the other and/or side-by-side), allowing the storage system to be readily expanded. The automated storage system may include robotics to load the media cartridges in the multimedia drives as needed.

Figure 1:
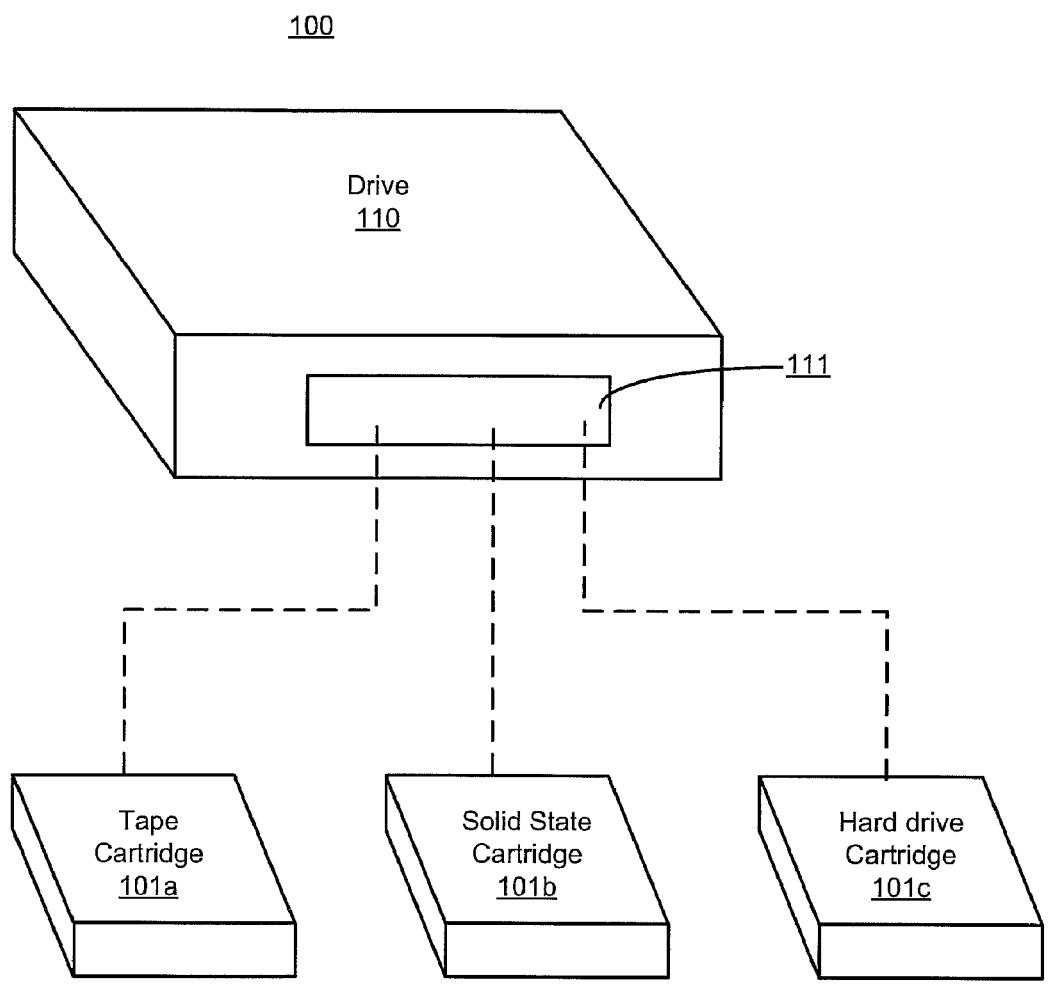
FIG. 1 illustrates a multimedia drive.

FIG. 1 illustrates an example of a multimedia drive 100. The multimedia drive 100 includes a drive 110 that receives media cartridges. FIG. 1 also shows different types of media cartridges 101a-c that may be received by the drive 110. For example, tape cartridge 101a, solid state cartridge 101b or hard disk cartridge 101c may be inserted into the drive 110 so data on the respective medium of the media cartridge inserted into the drive can be read from or written to or so other data storage operations may be performed on the media cartridge. The dashed lines shown in FIG. 1 represent that a media cartridge in the drive 110 may be replaced by a different media cartridge as desired.

Figure 2A:
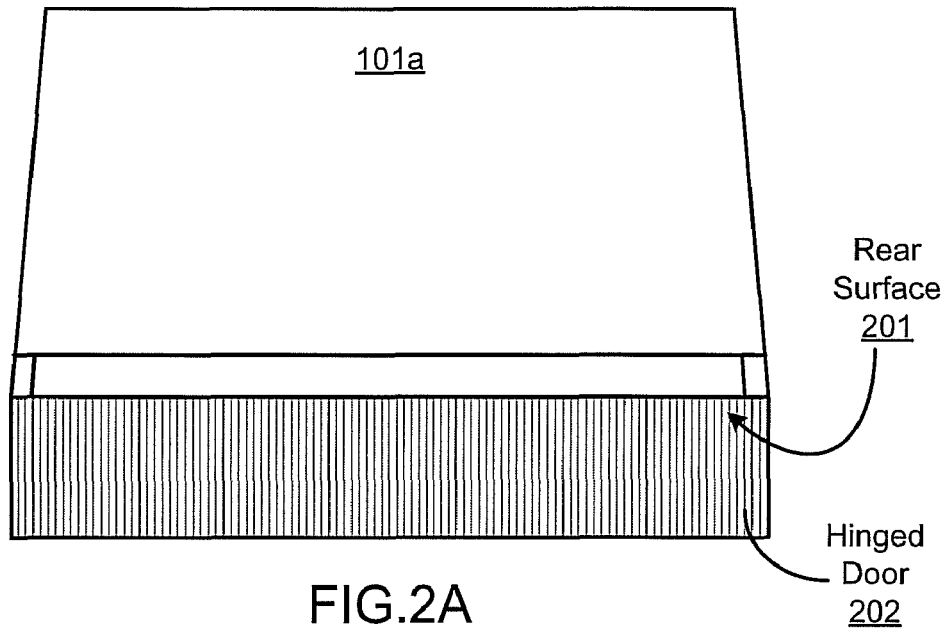
FIGS. 2A-B illustrate multimedia cartridges.
Figure 2B:
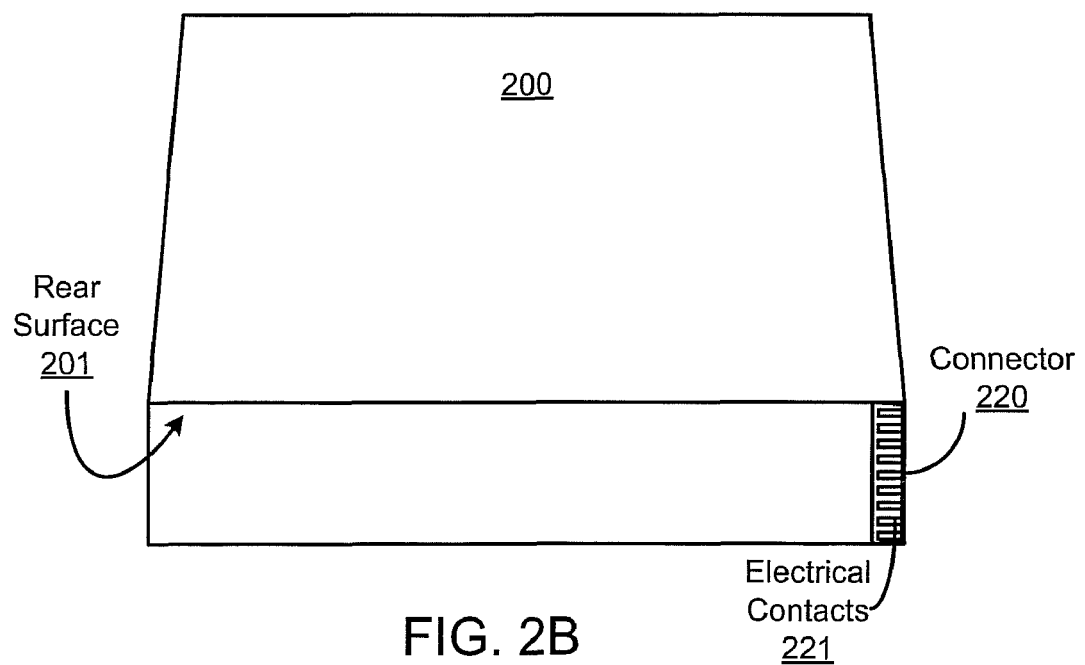

FIGS. 2A-B show more details of media cartridges. FIG. 2A shows tape media cartridge 101a. Surface 201 is a rear surface of the tape media cartridge 101a. The surface 201 may comprise a hinged door 202. The hinged door 202 may open when the tape media cartridge is inserted into the drive 110 to expose the tape in the tape media cartridge 101a to a media interface in the multimedia drive 100. The media interface may include tape heads to read or write data from the tape when the tape media cartridge 101a is in the drive 110. Examples of media interfaces are shown in FIG. 3.

A non-tape media cartridge may include a connector with electrical contacts that connect to a media interface in the multimedia drive 100 to electrically couple the storage medium in the media cartridge to the drive. FIG. 2B shows an example of a connector 220 with electrical contacts 221 on a non-tape media cartridge 200. The non-tape media cartridge 200 may be the solid state cartridge 101b, the disk cartridge 101c, or a cartridge housing a storage medium other than tape. The connector 220 may be positioned on a rear surface 201 of the media cartridge 200. By way of example, the connector 220 may comprise a universal serial bus (USB) connector, a small computer system interface (SCSI) connector, a serial advanced technology attachment (SATA) connector, etc. The connector 220 may be positioned so it does not interfere with tape heads in the drive 110. For example, the connector 220 is positioned in the top right corner on the rear surface 201, however, the connector 220 may be located in other positions. The connector 220 may be spring loaded so it remains flush with the rear surface until it is inserted into the drive 110. For example, when the non-tape media cartridge 200 is inserted into the drive 110, the connector 220 is caused to protrude from the rear surface 201 so the connector 220 can electrically contact a media interface in the drive 110 to read and write data from the storage medium. The connector 220 may mate with an electrical connector in the media interface in the drive 110 to electrically couple the storage medium to the multimedia drive 100 so date can be read from or written to the storage medium in the non-tape media cartridge 200. Although not shown, the non-tape media cartridge 200 may include the hinged door 202 shown in FIG. 2A to protect the connector 220 when the non-tape media cartridge 200 is not inserted in the drive 110.

The media cartridges shown in FIGS. 1 and 2A-B may have dimensions that conform to a predetermined standard which may be set by a standard organization or some other entity. Similarly, the dimensions of the multimedia drive 100 may conform to a predetermined standard. For example, the dimensions of the multimedia drive 100 may conform to a standard bay size in a storage rack or in a computer system. The dimensions of the multimedia drive 100 may conform to traditional cartridge sizes that are used with robotics in an automated storage system. For example, robotics may be designed to move tape cartridges or hard drives, and the multimedia drive 100 may conform to traditional cartridge or hard drive sizes so the multimedia drive 100 can be used with existing robotics. Also, the media cartridges shown in FIGS. 1 and 2A-B may allow for different mediums to be replaced in the cartridge. For example, the cartridge may include an opening or a door that allows the medium in the cartridge to be replaced with a different medium.

Figure 3:
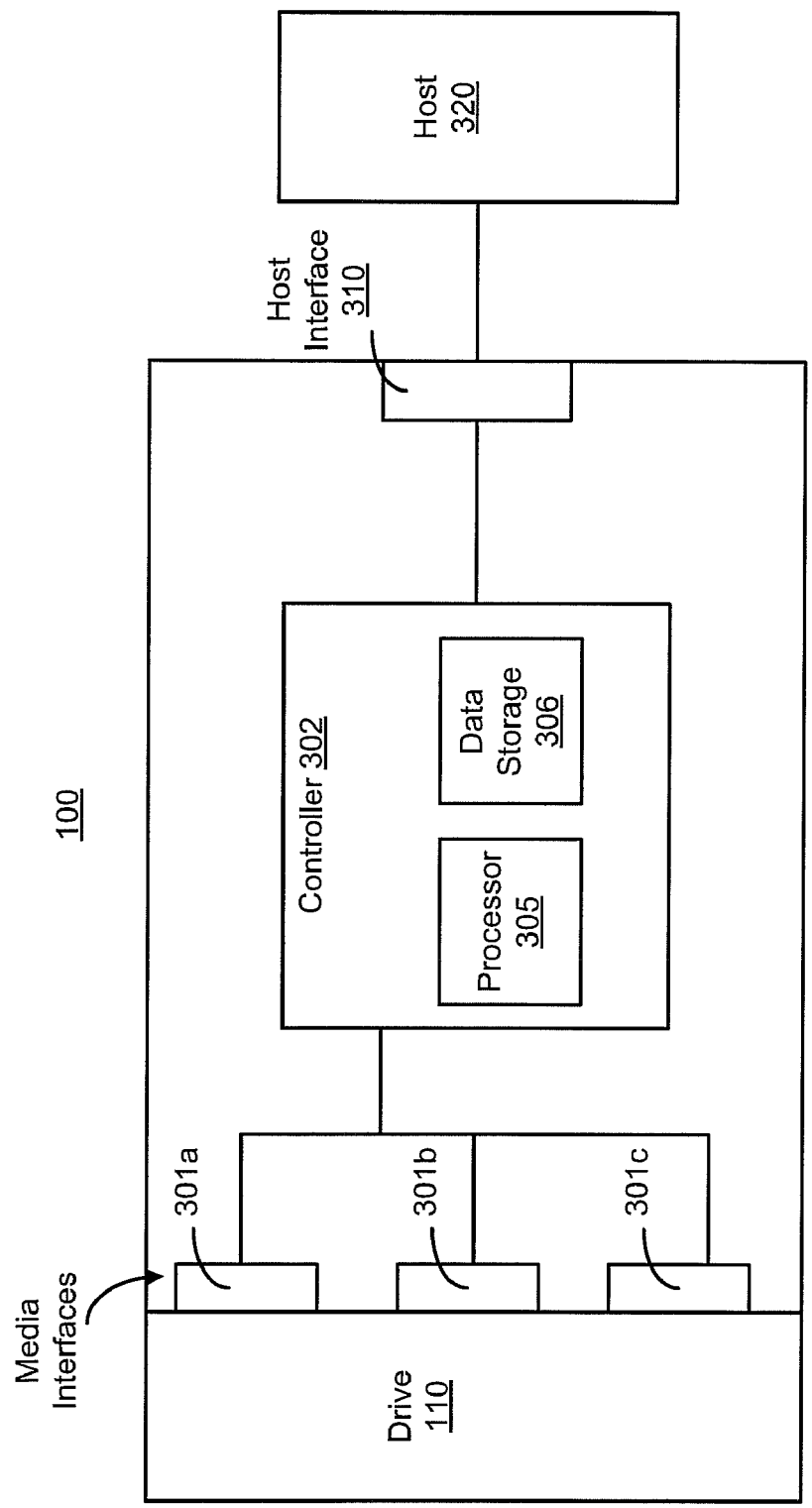
FIG. 3 illustrates components of the multimedia drive.

FIG. 3 is a block diagram of the components of the multimedia drive 100. The multimedia drive 100 includes the drive 110, media interfaces 301a-c, controller 302 and host interface 310. The media interfaces 301a-c electrically couple the multimedia drive 100 to the storage medium of a media cartridge received in the drive 110. More or less than three media interfaces may be included in the multimedia drive 100. Examples of the media interfaces 301a-c may include tape heads, USB connector, SCSI connector, etc. For example, media interface 301 comprises the tape heads to perform data operations, such as read/write operations. The media interfaces 301b-c may include media interfaces for non-tape media cartridges. The media interfaces 301b-c may include electrical connectors electrically coupling to a connector on the media cartridge. The media interfaces 301b-c communicate data, may communicate commands and/or may provide power to a media cartridge.

The controller 302 may include a processor 305 and data storage 306. The data storage 306, e.g., memory, stores machine readable instructions that are executed by the processor 305 to perform the functions of the multimedia drive 100, such as reading and writing data, executing commands from a host 320 and other functions. The host interface 310 connects the multimedia drive 100 to the host 320. The host interface 310 may include a USB connector, SCSI connector, SATA connector, etc. The host 320 is a computer system that may send commands to the multimedia drive 100 to perform data operations, such as read/write operations, on the storage medium in the media cartridge in the drive 110. The host 320 may include a personal computer, a server, etc. The multimedia drive 100 may be connected to one host or multiple hosts through one or more host interfaces.

In one example, the processor 305 may operate in a tape emulation mode. For example, the host 320 may send tape drive commands to the multimedia drive 100, however, the media cartridge in the drive 110 may not be a tape cartridge. The processor 305 receives tape drive commands from the host 320, such as rewind, write blocks, read blocks, etc., and converts the commands to read/write commands to perform the requested data operations on the non-tape, random access medium.

Figure 4:
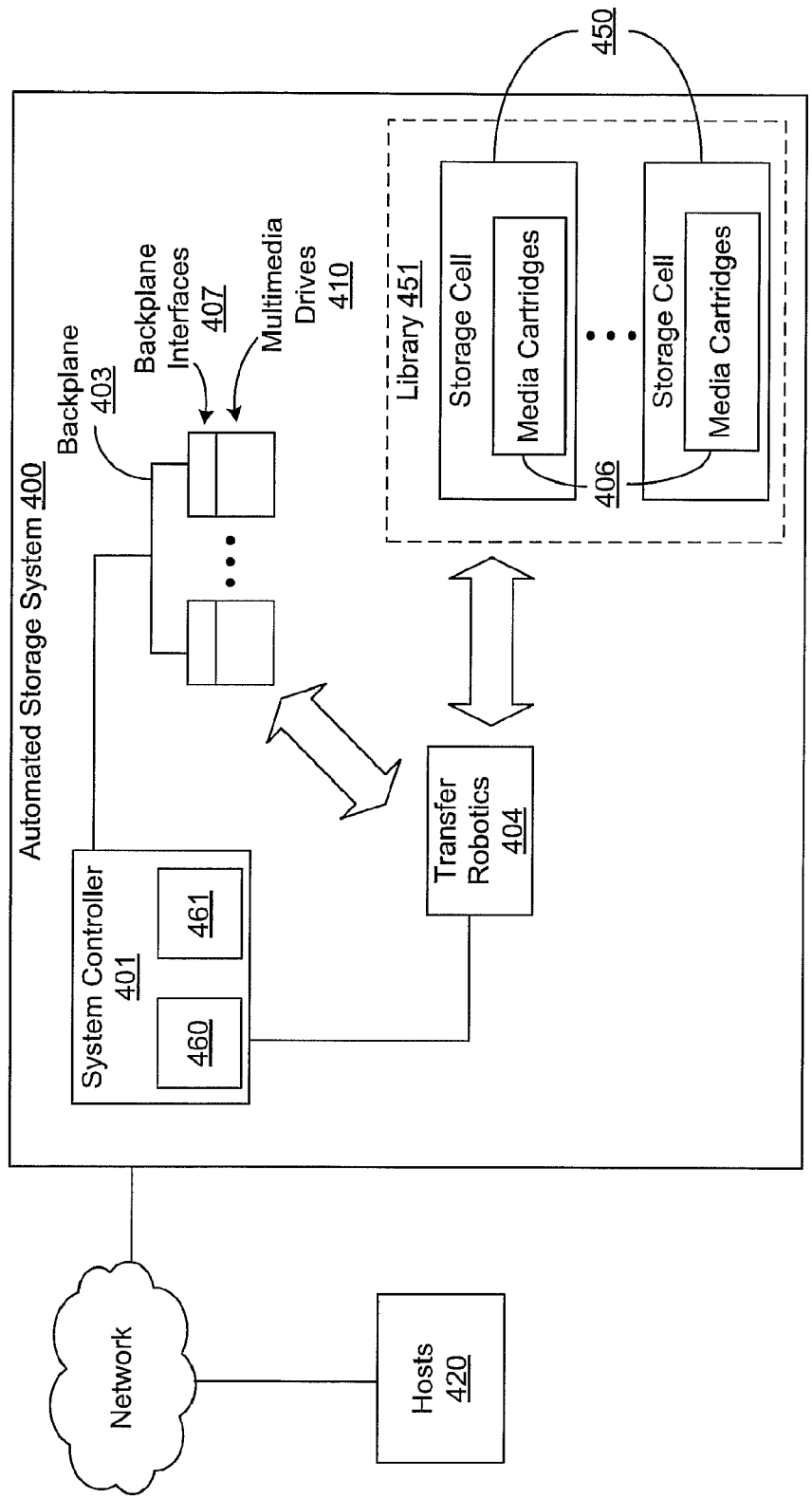
FIG. 4 illustrates an automated storage system.

FIG. 4 shows an example of an automated media storage system 400 that uses multimedia drives 410. Each of the multimedia drives 410 may be comprised of the multimedia drive 100 described above. The automated storage system 400 also includes a system controller 401, a backplane 403, transfer robotics 404 and libraries 405 comprised of storage cells storing media cartridges 406.

The multimedia drives 410 may be connected to the backplane 403 for read and/or write operations. The backplane 403 may include an electrical connection, such as a bus. Backplane interfaces 407 are connected to the backplane 403 so the multimedia drives 410 connected to the backplane interfaces 407 are electrically connected to the system controller 401 via the backplane 403. The backplane interfaces 407 may comprise electrical connectors. Transfer robotics 404 may also be provided for transporting the media cartridges 406 in the storage system 101. Transfer robotics 404 are generally adapted to retrieve media cartridges 406 (e.g., from the storage cells 450) from a library 451, transport the media cartridges 406, and place the media cartridges 406 in the multimedia drives 400 and retrieve the media cartridges 406 from the multimedia drives 400. Each of the storage cells 450 may store multiple media cartridges. The system controller 401 may send instructions to the transfer robotics 404 to retrieve a particular media cartridge from one of the storage cells 450 and place the media cartridge in one of the multimedia drives 410 or to remove a particular media cartridge from one of the multimedia drives 410 and place the media cartridge in one of the storage cells 450.

The system controller 401 may be communicatively coupled to hosts 420. In one example, the hosts 420 are connected to the automated storage system 400 via a network. The system controller 401 may receive requests to read/write data from the hosts 420 and provide them with access to the data in the media cartridges 406. The system controller 401 may comprise a processor 460 and data storage 461 storing machine readable instructions which are executable by the processor 460 to perform the functions of the system controller 401.

The system controller 401 receives read/write requests from the hosts 420 and identifies a media cartridge in the library for storing or reading the data and instructs the transfer robotics to place the media cartridge in one of the multimedia drives 410 if the media cartridge is not already in one of the multimedia drives 410. In one example, the system controller 401 selects a media cartridge that matches the data access requirements of the user or system. For example, if fast data access is needed, a solid state media cartridge or a hard drive media cartridge may be selected from the library 450 to store the data. However, a tape media cartridge may be used for after-hour back-ups. A host may indicate the data access requirements to the system controller 401 and the system controller 401 selects the media cartridge accordingly.

The controller 302 shown in FIG. 3 may operate the multimedia drive 100 in a tape emulation mode. For example, the host 320 may send read/write instructions to the multimedia drive 100 to read/write data from a media cartridge in the drive 110. The host 320 may expect the multimedia drive 100 to be a tape drive, and the instructions from the host 320 may be tape drive commands, such as rewind, write blocks, read blocks, etc. For example, the host 320 may be running legacy tape backup software to backup data, however, the system administrator decided to store the backup data on a hard drive cartridge rather than a tape cartridge. The controller 302 may operate in a tape emulation mode to convert the tape drive commands to addressing commands to retrieve the data from the hard drive cartridge. For example, tape drives are sequential access devices and the data may instead be stored on a random access device, such as a hard drive cartridge or a solid state cartridge. The controller 302 converts sequential access commands to random access commands to perform read/write the requested data.

Figure 5:
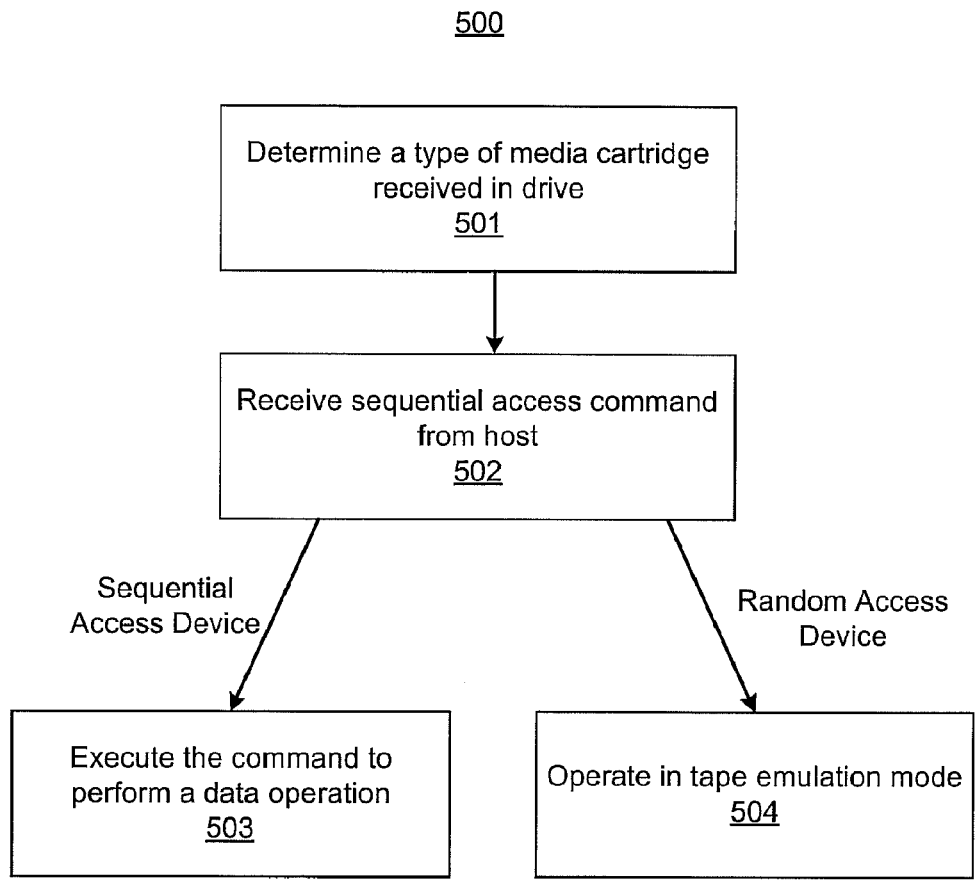
FIG. 5 illustrates a method.

FIG. 5 illustrates a method 500 for using the multimedia drive to access data. The method 500 may be performed by the controller 302 and described with respect to the multimedia drive shown in FIGS. 1 and 3 by way of example.

At 501, the multimedia drive 100 determines a type of media cartridge received in the drive 110. For example, when a media cartridge is inserted in the drive 110, a signal is sent over one of the media interfaces to indicate to the controller 302 the type of media cartridge, which may include sequential access, random access, medium type, etc.

At 502, a sequential access command is received from the host 320.

If the media cartridge in the drive 110 is a sequential access device, such as a tape cartridge, the controller 302 executes the command to perform a data operation at 503. If the media cartridge in the drive 110 is a random access device, such as a hard drive cartridge or a solid state cartridge, then the controller 302 operates in tape emulation mode at 504 to perform a data operation associated with the command.

Functions, steps and methods described herein may be embodied as machine readable instructions stored in non-transitory computer readable medium. The machine readable instructions may be executed by a processor or other processing circuitry.

What is claimed is:

1. A multimedia drive to receive a plurality of different types of media in a single drive, the multimedia drive comprising:
   a drive to receive media cartridges including tape and non-tape media cartridges;
   a tape interface to connect to a tape cartridge if the tape cartridge is received in the drive; and
   a media interface to connect to a non-tape media cartridge if a non-tape media cartridge is received in the drive.

2. The multimedia drive of claim 1, wherein the non-tape media cartridge comprises a solid state cartridge housing a solid state storage device.

3. The multimedia drive of claim 1, wherein the non-tape media cartridge comprises a hard drive cartridge housing a hard drive.

4. The multimedia drive of claim 1, wherein the non-tape media cartridge comprises a connector with contacts that are received in the media interface to electrically couple the non-tape media cartridge to the multimedia drive.

5. The multimedia drive of claim 1, wherein the non-tape media cartridge and the tape cartridge have dimensions that conform to a predetermined standard.

6. The multimedia drive of claim 1, wherein the non-tape media cartridge and the tape cartridge cannot be simultaneously inserted in the multimedia drive.

7. The multimedia drive of claim 1, comprising:
   a controller connected to the tape interface and the media interface to read and write data to a tape in the tape cartridge if the tape cartridge is received in the drive and to read and write data to media in the non-tape media cartridge if the media cartridge is received in the drive.

8. The multimedia drive of claim 7, comprising:
   a host interface connecting the controller to a host, wherein controller receives commands for data operations from the host via the host interface and sends and receives data to the host via the host interface.

9. An automated storage system comprising:
   a library including storage for media cartridges;
   a backplane including interfaces connecting multimedia drives to the backplane;
   transfer robotics to access the media cartridges from the library and place the media cartridges in the multimedia drives; and
   a system controller to perform data operations on the media cartridges in the multimedia drives and to control the transfer robotics based on data requests, wherein each of the multimedia drives includes a drive to receive the media cartridges, a tape interface to connect to a tape cartridge if one of the media cartridges received in the drive is a tape cartridge, and a media interface to connect to a non-tape media cartridge if one of the media cartridges received in the drive is a non-tape cartridge.

10. The automated storage system of claim 9, wherein the non-tape media cartridge comprises a solid state cartridge housing a solid state storage device.

11. The automated storage system of claim 9, wherein the non-tape media cartridge comprises a hard drive cartridge housing a hard drive.

12. The automated storage system of claim 9, wherein the non-tape media cartridge comprises a connector with contacts that are received in the media interface to electrically couple the non-tape media cartridge to the multimedia drive.

13. The automated storage system of claim 9, wherein the non-tape media cartridge and the tape cartridge have dimensions that conform to a predetermined standard.

14. The automated storage system of claim 9, wherein a media cartridge in the library is selected by the system controller to place into one of the multimedia drives based on data access requirements of data to be read from or written to the media cartridge.

15. A method of utilizing a multimedia drive comprising:
   determining a type of media cartridge received in a drive of the multimedia drive, wherein the multimedia drive includes a first media interface to electrically couple a sequential access media cartridge to the multimedia drive if the type of media cartridge received in the drive is sequential access and the multimedia drive includes a second media interface to electrically couple a random access media cartridge to the multimedia drive if the type of media cartridge received in the drive is random access;
   receiving a sequential access command from a host;
   if the media cartridge received in the drive is a sequential access device, executing the sequential access command; and
   if the media cartridge received in the drive is a random access device, operating in a tape emulation mode to execute the sequential access command.

* * * * *